United States Patent [19]
Nelson

[11] 3,916,702
[45] Nov. 4, 1975

[54] DOUBLE ROLLER CAM DRIVES
[76] Inventor: Daniel E. Nelson, 4875 Sand Lake Rd., Orlando, Fla. 32809
[22] Filed: Nov. 19, 1973
[21] Appl. No.: 417,110

[52] U.S. Cl.............. 74/57; 74/568 R; 74/569; 308/202
[51] Int. Cl............................................. F16h 25/12
[58] Field of Search................. 74/568 R, 569, 57; 308/202

[56] References Cited
UNITED STATES PATENTS
1,339,276  5/1920  Murphy ......................... 74/569 X
2,451,374  10/1948  Bell ................................. 74/57
3,304,791  2/1967  Geeson ............................ 74/569

*Primary Examiner*—Samuel Scott
*Assistant Examiner*—F. D. Shoemaker
*Attorney, Agent, or Firm*—Daniel E. Nelson

[57]  ABSTRACT

A counter-bevelled cam drive with double roller cam followers with optional cone shape with manual or pressurized inward adjustment for accuracy and wear.

5 Claims, 8 Drawing Figures

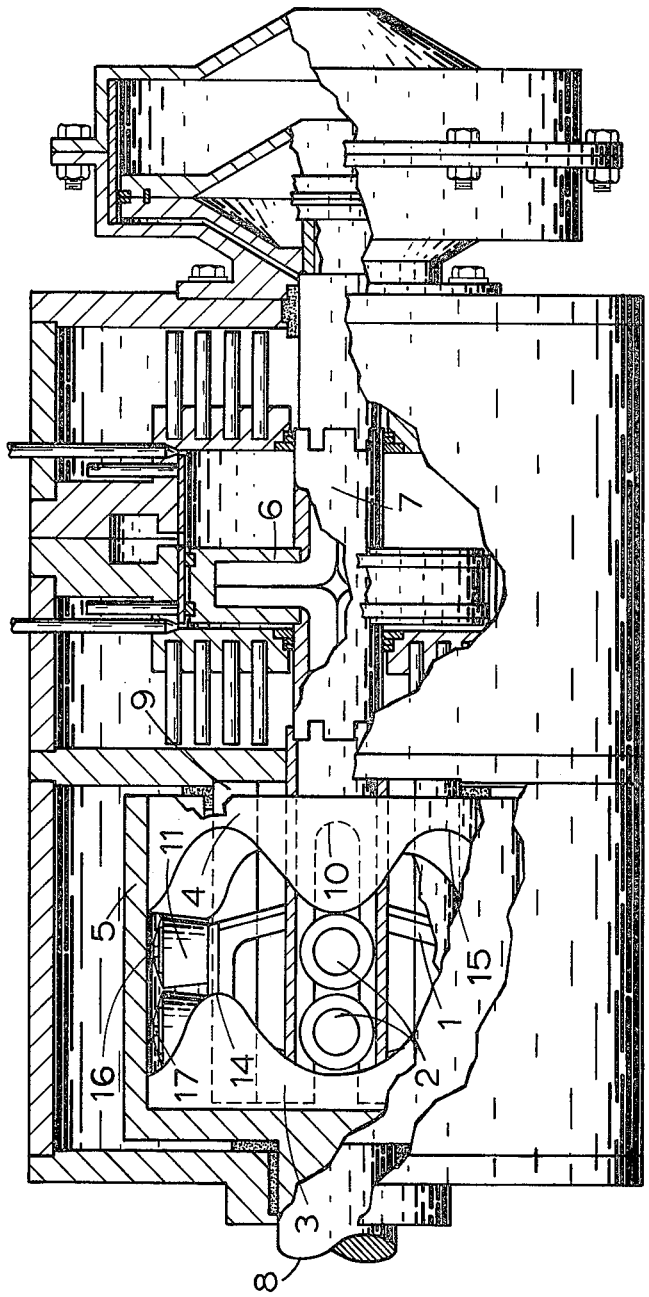
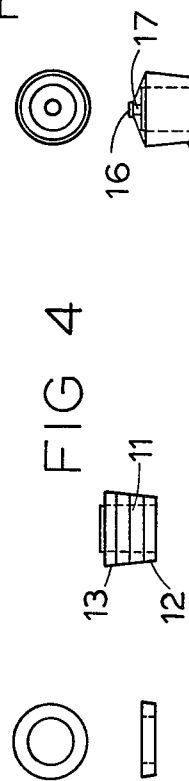
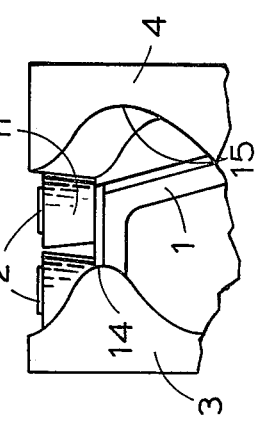
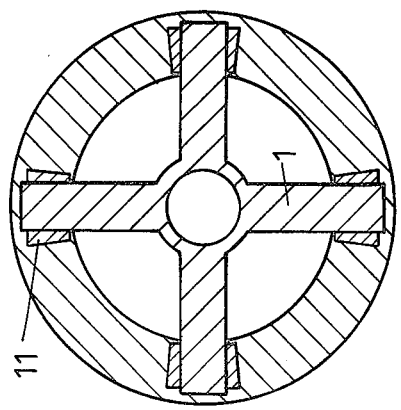

DOUBLE ROLLER CAM DRIVES

Objects of this invention are to provide roller drive to reduce wear in counter-bevelled cam drive, to provide cone roller drive and to provide manually or automatically adjustment to compensate for wear or inaccuracy.

Counter-bevelled groove cam drives heretofore have employed a circular or other form of rigid cam follower or cam drive member. A roller was not employed because it would be of negligible value as a result of rotational direction change of the roller in engaging first one side and then the opposite side of the counter-bevelled cam drive groove.

A double roller keeps the same roller against the same side of the cam and thus reduces friction from directional change.

An adjustable pressure setting for the roller allows the rollers to be moved inwardly to adjust for wear and inaccuracies.

This invention is illustrated in the following drawings wherein:

FIG. 1 is a sectional cutaway view of the cam drive.

FIG. 2 is the top view of a single roller.

FIG. 3 is a side view of a single coneshaped roller.

FIG. 4 is a side view of a set of multiple cone rollers in series to form a single cone-shaped roller.

FIG. 5 is a top view of a cone roller with Belleville Spring pressurized inward adjustment.

FIG. 6 is a side view of a cone, a Belleville Spring and drive tooth pin assembly with inward pressurized adjustment.

FIG. 7 is a cross-section end view of a roller cam drive assembly taken through the section of one of the rollers.

FIG. 8 is a side view cutaway drawing of a typical Regenerative Combustion Cycle Piston Engine, U.S. Pat. No. 3,570,463, employing the double roller cam drive.

The operation of this invention is described as follows:

Cam drive teeth 1 are provided with two roller pins 2 at the end of each of said drive teeth. These teeth are caused to engage opposite side races 3 and 4 of a cam drive groove around the inside periphery of a drive shaft sleeve 5 by either reciprocating travel of a power piston 6 and power shaft 7 assembly in engine power output mode or by rotary travel of rotary shaft 8 in pump mode of operation of the device.

A transverse guide 9 with transverse guide channels 10 is positioned circumferentially between the power shaft and the races of the cam drive groove. The drive teeth are extended through the channels of the transverse guide and are allowed to reciprocate with the power shaft but are arrested from rotational travel, such that rotary motion of the cam is buttressed by the walls of the transverse guide.

Cone rollers 11 are provided to compensate for the difference in rotational speed between the inside end 12 and outside end 13 of the rollers. However, the difference in roder speed at the inside and outside ends of the rollers is not the same as for flat-surface roller bearing races. The incline of the counter-bevelled cam drive races decreases the requirement for degrees of cone roller taper in proportion to the degree of incline for optimum friction reduction. The degree of taper required for an angle of incline of 45 degrees would, therefore, be one-half that of a flat race for equal race diameters.

Optimum cone angle is the same only at the point of peak 14 and valley 15 of the counter-bevelled cam drive races as for flat races in thrust bearing practice.

But this is a minute portion of the roller travel. Further, the optimum cone angle, and the corresponding race surface angle change during all curvatures of the cam surface. This curvature surface effect results at the approaches to the peaks and valleys and occurs constantly for harmonic or curving inclined angles of the counter-bevelled drive cam.

The most ideal cone angle requirement changes at different portions of the circle of rotation. A compromise cone angle is required to meet all conditions with the most nearly optimum cone angle.

The cone angle should be more nearly the requirements of those portions with the greatest portion of rotation and having the greatest piston pressure resistance.

A harmonically curved cam groove is not optimum because it limits the optimum cone angle portion of travel. Straight line inclines are preferable between tangents to peaks and valleys of the groove.

The optimum cone angle requirement for least friction can be decreased by either decreasing the width of the cone as shown in FIG. 3 or by employing a series of cones as shown in FIG. 4. The former requires an increased cam race diameter and increased number of rollers to maintain equal contact surface between the rollers and the cam races. The cones in the series rotate at different speeds during incline changes in the races and reduce the friction that would be caused otherwise by different rotational speeds during such portions of counter-bevelled cam race rotation.

The multiple roller mode makes straight cylinder rollers feasible without undue friction.

The greatest benefit from coned rollers, therefore, becomes the inward adjustment of the rollers towards the shaft to compensate for wear of the rollers or of the cam races. Moving the rollers inward radially causes them to take up any space resulting from such wear in a similar way to the manner in which a wedge is caused to engage surfaces of a wedge-shaped cavity when the cavity has been enlarged and the wedge is injected farther in the cavity to compensate for the enlargement. The same is true if the wedge is a rotating cone and the cavity has two rotating walls, and the walls are rotating in inclined-plane relationship, as in the counter-bevelled cam drive.

The optimum angle is somewhat less than the seven degrees of a helical thread limit. This prevents outward travel of the roller from pressurized race engagement. The optimum cone angle decreases with increase in cam diameter ratio to roller diameter and to increase in inclined-plane angle of the races.

Absence of outward pressure of the rolled from cam action below a cone angle of seven degrees makes the use of springs for constant pressurization feasible to force the rollers inward radially towards the power shaft to compensate for wear of the roller or of the cam races. A mechanical adjustment such as a bolt 16 can be used as the mechanical adjustment.

A combination of a bolt and a spring 17, here represented by a Belleville cone spring, is recommended as shown in FIG. 5 and FIG. 6.

What is claimed is:

1. A double-roller cam drive having a counter-bevelled cam drive groove around the inside periphery of a drive shaft sleeve, drive teeth centrally attached to a power shaft and extended radially through channels in a transverse guide circumferentially positioned around the outside of the power shaft and extended selectively between the drive shaft and the drive cam races, double axle roller pins in tandem relationship on portions of the drive extended between the cam races, and rollers on the roller pins.

2. A double-roller cam drive as described in claim 1 and having tapered cone rollers, and oppositely tapered and matching drive cam races.

3. A double-roller cam drive as described in claim 2 and having mechanical radial adjustment positioning of the rollers.

4. A double-roller cam drive as described in claim 2 and having pressurized radial adjustment positioning of the rollers.

5. A double-roller cam drive as described in claim 2 and having mechanically adjusted radial pressurization of the rollers.

* * * * *